May 5, 1970     E. K. BOWEN ET AL     3,510,138
OIL SEAL WITH ROCK SHIELD AND WEAR SLEEVE
Filed Oct. 15, 1965     3 Sheets-Sheet 1

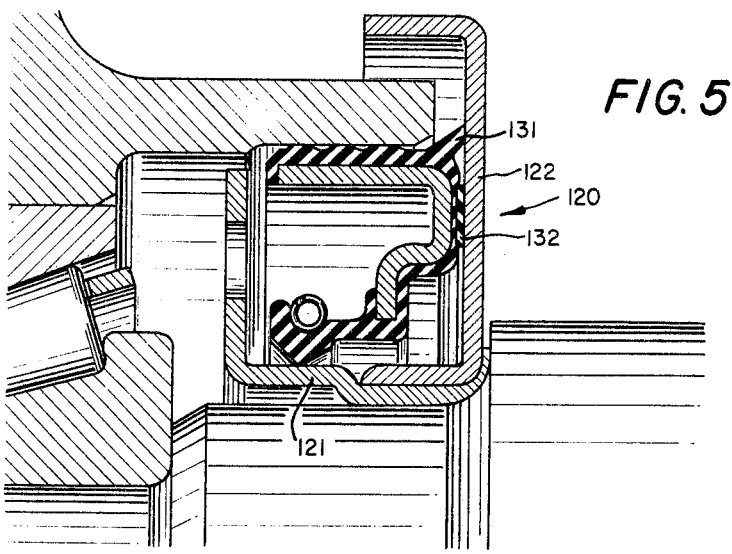

United States Patent Office 3,510,138
Patented May 5, 1970

3,510,138
OIL SEAL WITH ROCK SHIELD AND WEAR SLEEVE
Edward K. Bowen, Los Altos, Calif., and Philip A. Smith, South Lyon, and Kenneth N. Donelson, Warren, Mich., assignors to Federal Mogul Corporation, Detroit, Mich., a corporation of Michigan
Filed Oct. 15, 1965, Ser. No. 496,619
Int. Cl. F16j 15/32
U.S. Cl. 277—35         9 Claims

ABSTRACT OF THE DISCLOSURE

A shaft seal combined with a wear-sleeve-rock-shield member having an inner cylindrical portion with an inner face (often elastomer lined) that fits around the shaft and an outer face in rotating sealing engagement with an elastomeric oil-sealing lip, and also having an outer rock-shield portion that lies close to the housing and is joined to the inner portion by a radial web. The rock-shield portion helps to ward off blows from foreign particles, to protect the seal and to fling particles away therefrom.

A metal seal case may have a radial flange that cooperates with the end wall of the housing to provide therewith a cylindrical water collecting and eliminating groove. The outer rock-shield portion may extend angularly back axially toward the housing end wall and axially back past this flange. The seal case may also have a stepped portion extending axially beyond the housing end wall and holding a felt, dirt-excluding seal that engages the wear sleeve.

Also, the seal may be unitized, the seal unit then having a radial flange of its case which may support the sealing lip on one side and having an elastomeric portion on the other side, with a hard rubber ring supported by the elastomeric portion. The wear sleeve then has a radially outwardly extending portion lying on one side of the seal unit, and there is on the other side a seal unitizing member secured to the wear sleeve and having a radial portion with a bead in initial running engagement with the ring. The seal unitizing member may also include a cylindrical shield portion. The unitized seal may have an axial lip instead of the hard rubber ring, the axial lip being made from hard oil-resistant synthetic rubber.

---

This invention relates to an improved oil seal and to an improved oil seal installation of the type that protects the seal by a rock shield.

The new seal has many uses and solves several problems of long standing. For example, in automotive pinion seals which face the front end of the car and thereby tend to collect a considerable amount of dirt, dust, water, and other foreign matter, there is a considerable problem in keeping foreign material away from the seal area. If not kept away, abrasion, corrosion and leakage may follow, and the seal may fail. Hence, in some applications a rock shield has been installed as a separate element to ward off foreign matter and deter it from reaching the seal, which usually runs on the universal joint flange.

In the present invention, the seal is provided with a rock shield as an integral element of the seal assembly. This rock shield may be made as a part of a member which also serves as a wear sleeve upon which the sealing member rides and which also performs some other significant functions. Some results, but by no means the only results, are a great improvement in protecting the seal lip from dirt, dust and water, a reduction of installation cost, and simplicity of handling.

Another problem with oil seals has been the need to provide a very smoothly machined shaft for the oil seal to run on, and this has also involved extra expense. In the present invention, money is saved by providing a wear sleeve made of sheet metal upon which the seal lip rides. While this, in itself, is not new, it is new to have the wear sleeve and the rock shield form parts of the same member or, at least, parts of the same assembly, so that at lower cost a better sealing surface is obtained, as well as the protection of the lips from foreign matter. The costly ground finish of the universal joint flange is avoided by the manufacturer, while the wear sleeve can be finished by a vibratory deburr-type operation to provide a roughened surface that helps to obtain an oil film when EP fluids are used. It may be noted that EP fluids do not have very good lubricating qualities for oil seals and provide some difficulties at this particular sealing position. It may also be noted that the shaft forgings generally used by automobile manufacturers have tended to contain inclusions which provide a poor surface for oil seals to run upon, and when grinding is done somewhat improperly or when the parts are nicked or scratched as in in-plant handling, the shaft surface has been still worse. Thus, the present invention provides a greatly improved surface at much lower cost.

Another problem to which the invention is addressed is that of seal replacement. Formerly it has been necessary to provide upon replacement a new companion flange for the seal, at considerable cost. However, in the present invention a new relatively inexpensive wear sleeve may be installed instead.

Thus, an oil seal of this invention improves oil seal reliability and performance while eliminating the need for final shaft finish; it provides safeguards against in-plant seal damage and makes installation a quick-foolproof procedure while lowering the manufacturing costs.

Another problem to which this invention relates is that of installation, which has often tended to be awkward and in some cases has caused an intolerable amount of seal damage. Also, the shaft member when ground had to be specially protected thereafter during in-plant handling. In the present invention, installation and in-plant handling are simple matters, and the seal is automatically guarded from damage during the installation by protecting structure that forms a part of the seal assembly.

The invention also relates to some problems in unitized seals. Unitized seals are those which include the wear sleeve and the sealing member in a single inseparable combination that is installed as a unit. One of the difficulties with unitized seals heretofore has been that upon installation a unitizing flange of the wear sleeve has necessarily been forced against a portion of the elastomeric sealing member. Then, when such seals began to operate, an objectionable loud squealing noise arose and considerable smoke tended to flow out from an initial wearing-off of that elastomer in contact with the unitizing flange. Since the elastomer has been relatively soft, the noise and smoke have sometimes gone on for a considerable period and have always been objectionable, even though they have not really damaged seal performance. The objections were so serious that many customers have not bought unitized seals, even though they could have obtained many advantages by doing so.

In the present invention there is no such squealing or smoke, and at the same time several advantages are obtained. For one thing, a very close spacing is obtained between the rock shield flange and the seal, so that dirt is excluded, and in some instances an actual lip seal or face seal is provided to guard the main sealing lip from the entry of dust.

Other objects and advantages of the invention will become apparent from the following description of some preferred embodiments.

In the drawings:

FIG. 5 is a similar view in elevation and in section of an installation incorporating another modified form of unitized seal of the invention.

Figure 1:
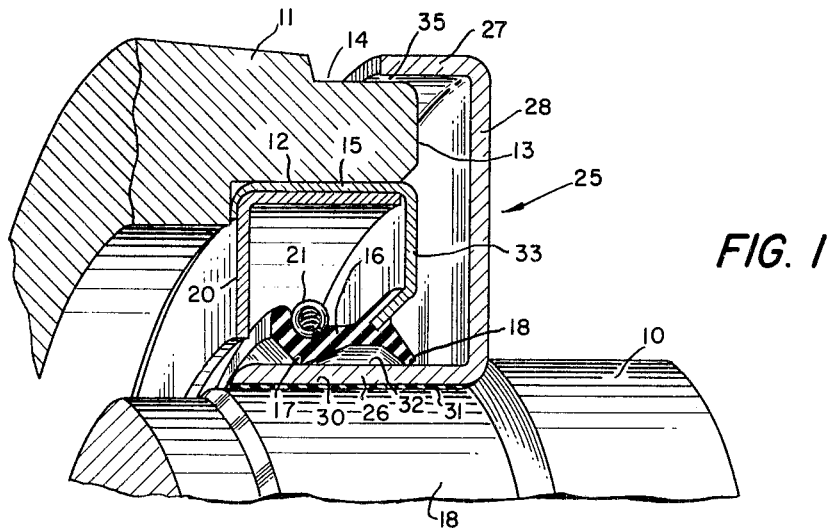
FIG. 1 is a view in perspective of a portion of an automotive pinion seal installation incorporatnig the principles of the invention.

A shaft 10 in FIG. 1 rotates inside a housing 11 having a cylindrical bore 12. The housing 11 also has an end face 13 and an outer cylindrical face 14. In the bore 12 is installed an outer metal case 15 having bonded thereto an elastomeric dual-lip sealing member 16, with a main lubricant sealing lip 17 and an auxiliary dust-sealing lip 18. An inner case 20, secured inside the outer case 15, helps to protect the seal 16 during installation. The main elastomeric sealing lip is preferably urged into a sealing position by a spring 21.

The seal assembly also includes a combination wear-sleeve-rock-shield unit 25, comprising an inner cylindrical wear sleeve portion 26, an outer cylindrical rock shield portion 27, and a radially extending web 28 connecting the two. Bonded to the inner cylindrical wear sleeve member 26 on its radially inner surface 30 may be a suitable elastomeric resilient lining 31 that fits snugly around the shaft 10. The shaft 10 need not be ground to receive the sleeve 26, for the lining 31 and the flexibility of the sheet metal member 25 accommodate such surface irregularities as occur. The wear sleeve 26 also has an inner cylindrical surface 32 which engages the seal lips 17 and 18.

The web 28 extends radially parallel to a radial flange 33 of the seal case 15 and to the face 13 of the housing 11, so that a fairly close tolerance is readily maintained, and the cylindrical rock shield portion 27 preferably extends radially past the face 13 of the housing 11 and in relatively close tolerance around the outer housing surface 14. Thus, there is a very small annular clearance 35 between the shield 27 and the surface 14, a narrow radial space between the seal case 15 and the web 28, and the auxiliary lip 18 protects the seal lip 17 from such few particles of foreign matter that do get through.

In installation, the seal case 15 is forced into the housing bore 12 before installation of the shaft 10, the inner case 21 providing seal lip protection. The rock-shield-wear-sleeve unit 25 is installed on the shaft 10, and then the shaft 10 is installed, the wear sleeve 26 then coming into contact with the seal lips 17 and 18.

Figure 2:
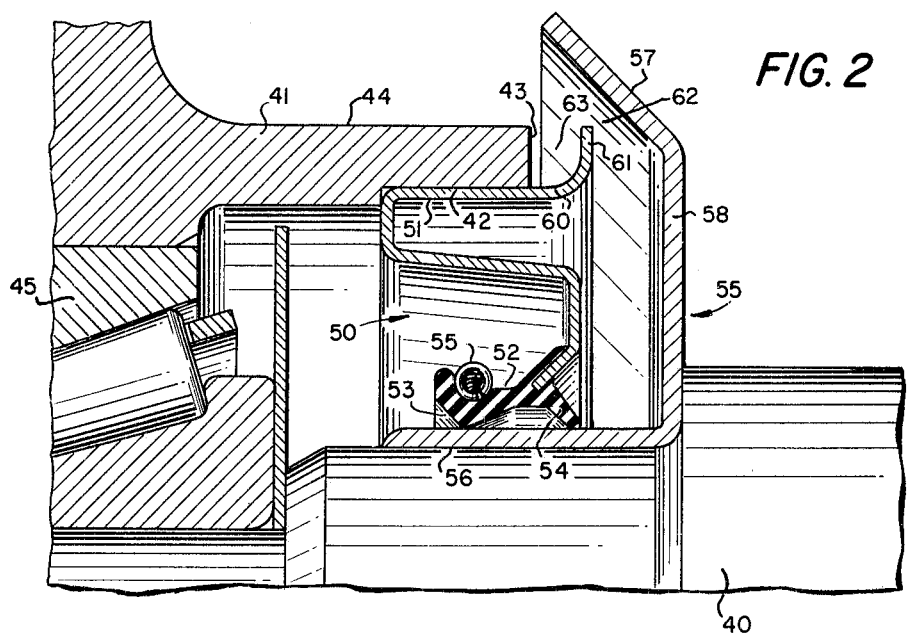
FIG. 2 is a view in elevation and in section of a similar installation embodying a modified form of seal that also embodies the principles of the invention.

The device in FIG. 2 is basically similar. Again, there are a shaft 40 and a housing 41 with a bore 42, an end wall 43 and a cylindrical outer surface 44. Bearings 45 are shown positioned between the shaft 40 and the housing 41. A seal assembly 50 here comprises a single metal case 51 to which an elastomeric sealing member 52 is bonded. Again, the sealing member 52 has two lips 53 and 54; one, a main lubricating sealing lip 53 which is spring-urged by a spring 55, and the other a dust sealing lip 54. A wear-sleeve-rock-shield member 55 has a wear sleeve 56, rock shield 57 and web 58, and the wear sleeve 56 is secured around the shaft 40. The rock shield 57 here is angularly extending. Because of the distance involved, the seal case 51 itself preferably has a cylindrical portion 60 that extends beyond the housing 41 and has a radially outwardly turned portion 61, to provide a narrow clearance space 62 between it and the rock shield 57. Also, the case 51 provides a groove 63 between the portion 61 and the housing face 43, so that water can collect and flow to the bottom where it drops off.

Figure 3:
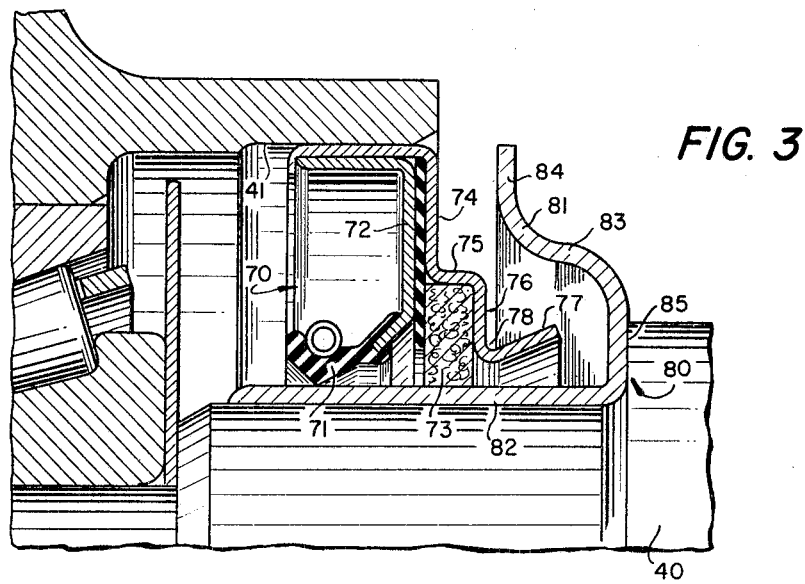
FIG. 3 is a similar view of a similar installation involving another modified form of the invention.

FIG. 3 shows another form of the invention comprising a seal unit 70 wherein a main elastomeric sealing lip 71 is bonded to an inner case 72 and in which a felt dust seal 73 is clamped between the wear case 72 and an outer case 74. The outer case 74 seals in the bore 41 with a press fit and is stepped down at 75 and 76 to hold the felt 73 and then is flared up again at 77 to help provide a water-diverting groove 78 and a labyrinth. Another unit 80 provides a rock shield 81 and a wear sleeve 82. In the rock shield 81, an inner radially outwardly extending portion 83 leads from the wear sleeve 82 to an axial portion 84, followed by a second outer radially extending portion 85. The rock shield 81 cooperates with the case 74 to protect the seal from entry of foreign matter.

Figure 4:
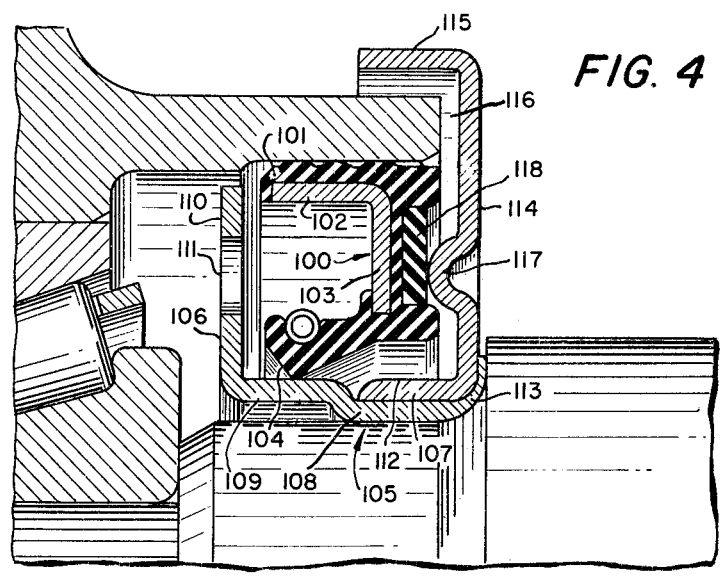
FIG. 4 is a similar view in elevation and in section of another installation incorporating a unitized seal embodying the principles of the invention.

FIG. 4 shows an improved unitized seal. Here, a seal unit 100 is provided with an outer elastomer surface 101 made according to patent application Ser. No. 366,561, filed May 11, 1964, now U.S. Pat. No. 3,356,376, backed up by a rigid case 102, and fitting in the bore. The case 102 has a radially extending portion 103 which supports a sealing lip 104. The wear sleeve rock shield assembly 105 is, in this instance, made of two pieces 106 and 107 in order to provide unitizing. The actual wear sleeve member 106 has an axial portion 108 that seals around the shaft and a spaced outer wear sleeve portion 109 which has clearance between itself and the shaft, and an oil flinging portion 110 which extends radially outwardly. Openings 111 are preferably provided through this oil flinger 110 to improve access of oil to the sealing lip 104.

The rock shield member 107 may include an inner cylindrical portion 112 which is held to the wear sleeve 106 by a lip 113. A generally radially extending portion 114 leads to an outer axial portion 115 that provides a close fitting dirt labyrinth 116 around the housing.

In this instance, the invention is also characterized by the rock shield member 107 having an inwardly extending continuous rib or bead 117 while the oil seal 100 is provided with an inset washer 118, preferably made from hard rubber, which may be bonded in the mold to the softer rubber elastomeric sealing member 104, when the member 104 is molded. The rib 117 engages the washer 118 and runs against it initially. The rubbing of the steel bead 117 against the hard rubber washer 118 does not result in squealing, as would happen if it rubbed against soft rubber, nor does it result in the smoking as there is less heat and because the member 118 is harder. Furthermore, after a very small amount of wear there will be an actual gap of separation between the rib 117 and the washer 118, and this gap will retain its clearance, unlike soft elastomer which tends to keep forcing itself out for some time to compensate for having actually been forced to flow outwardly by the pressure earlier placed against it. Thus, this invention makes for a quiet unitized seal and overcomes objections to unitized seals, and it also provides a very tight dirt labyrinth and a very snug passage which excludes almost all dirt from the actual sealing lip 104. In fact, if some dirt does accumulate in the narrow passage, it blocks the entry of other dirt.

FIG. 5 shows another modified form of unitized seal 120. Basically, the wear sleeve 121 structure is the same as in FIG. 4, and the rock shield 122 is similar, except that there is no rib 117 in this instance. The seal structure is also basically the same, except that a lip-type seal 131 is provided for riding against the radial sealing face of the rock shield member. This provides dirt exclusion in a somewhat different, but also effective way. Also, a bumper member 132 engaging the flange is preferably made of hard rubber so as to minimize any squealing and smoking effect and to provide a hard member to rub against during initial wearing in.

What is claimed is:

1. A sealing assembly, including in combination:
   a housing with a cylindrical bore an outer wall and an end wall
   a shaft rotatable within said bore,
   a fluid seal having a metal reinforcing member with a cylindrical portion press-fitted into said bore an an elastomeric oil-sealing lip, and
   a combination wear-sleeve-rock-shield member, having:
   an inner cylindrical portion with an inner face for fitting around said shaft and an outer face in rotating sealing engagement with said lip,
   an outer rock-shield portion lying close to and axially spaced from said outer wall and said end wall of said housing and extending radially out beyond said outer wall, and separated therefrom by a small clearance, and
   a radial web joining said inner and outer portions, said rock-shield portion helping to ward off blows from foreign particles to protect said seal and to fling particles away therefrom.

2. The sealing assembly of claim 1 wherein said metal reinforcing member of said fluid seal has its cylindrical portion extending out from said bore with a radially outwardly extending flange extending parallel to and spaced from said end wall to provide therewith a cylindrical water collecting and eliminating groove, and has a support portion extending radially inwardly from the other end of said cylindrical portion, said elastomeric seal element being supported by said support portion, said combination wear-sleeve-rock-shield member having its said outer rock-shield portion extending angularly back axially in the direction of said end wall and axially back past said flange, being separated therefrom by a short clearance.

3. A seal assembly for use between a rotating shaft and a housing spaced therefrom and having a bore and an end wall, comprising:
   a seal assembly having a case comprising a single sheet-metal member formed to provide a bore-engaging portion, a first radial portion adapted to lie flush with said end wall, a stepped portion extending axially beyond said end wall, a second radial portion connected thereto, and a generaly axially extending portion leading therefrom,
   an oil seal element in said case axially within said end wall,
   a felt, dirt-excluding seal outside said end wall at said stepped portion held in by said case, and
   a metal member providing:
   a radially inner cylindrical wear sleeve portion in rotary sealing engagement with said oil seal element and said felt seal for fitting on a said shaft,
   a radial web axially beyond said seal assembly, and
   a shield portion extending axially in toward said end wall and radially outwardly.

4. A seal assembly for use between a rotating shaft and a housing spaced therefrom and having a bore and an end wall, comprising:
   a seal assembly having a case with a bore-engaging portion, a first radial portion adapted to lie flush with said end wall, a stepped portion extending axially beyond said end wall, a second radial portion connected thereto, and a generally axially extending portion leading therefrom,
   an oil seal element in said case axially within said end wall,
   a felt, dirt-excluding seal outside said end wall at said stepped portion held in by said case, and
   a metal member providing:
   a radially inner cylindrical wear sleeve portion in rotary sealing engagement with said oil seal element and said felt seal for fitting on a said shaft,
   a radial web axially beyond said seal assembly, and
   a shield portion extending axially in toward said end wall and radially outwardly,
   said generally axially extending portion of said case extending conically radially outwardly to provide a water collecting and disposal groove in cooperation with said second radial portion, said shield portion axially covering most of said groove.

5. A unitized seal including in combination:
   a seal unit with a bore-engaging portion and having a metal reinforcing member with a radial flange, a sealing lip supported by said flange, an elastomeric portion on the side of said flange opposite to said lip and to said bore-engaging portion, and a hard rubber ring supported by said elastomeric portion,
   a wear sleeve having a shaft-engaging surface, a lip-engaging surface, and a radially outwardly extending portion lying on one side of said seal unit, and
   a seal unitizing member secured to said wear sleeve and having a radial portion on the opposite side of said seal unit from said radially outwardly extending portion and having a bead in initial running engagement with said ring.

6. The unitized seal of claim 5 wherein said wear sleeve has a first cylindrical portion engaging said shaft and connected by a radial outer step to a second cylindrical portion engaging said sealing lip, and said radially outwardly extending portion which serves as an oil flinger, said seal unitizing member comprising:
   a shield comprising a cylindrical portion clamped into said first cylindrcal portion, said radial portion, and a cylindrical flange radially beyond said seal unit.

7. A unitized seal including in combination:
   a seal unit having a radial type oil sealing lip, bore-engaging means, and an axially extending lip,
   a wear sleeve secured on said shaft and in rotary sealing engagement with said radial lip, and having a unitizing radial flange on one side of said seal unit, and
   a shield secured to said wear sleeve and having a radial flange on the other side of said seal unit from said unitizing radial flange and engaged by said axially extending lip.

8. The seal of claim 7 wherein said axially extending lip and said radial lip are one integral piece of soft oil-resistant elastomer connected by a radial elastomeric portion, and said radial elastomeric portion supports a bumper made from hard-oil-resistant synthetic rubber in initial running engagement with the radial flange of said shield.

9. The seal of claim 7 wherein said wear sleeve has a first cylindrical portion engaging said shaft and a radially outstepped second cylindrical portion engaging said sealing lip, and said radial flange comprises a radially outwardly extending oil flinger on the opposite side of said seal from said axially extending lip, said shield having at the radially outer extremity of its said radial flange a cylindrical flange extending toward the other side of said seal.

References Cited

UNITED STATES PATENTS 2,564,792   8/1951   Roos _____ 277—58
3,341,265   9/1967   Paterson _____ 277—94 X HOUSTON S. BELL, Jr., Primary Examiner U.S. Cl. X.R.

277—58, 153, 235; 308—36.4, 187.1

UNITED STATES PATENT OFFICE
CERTIFICATE OF CORRECTION

Patent No. 3,510,138            May 5, 1970

Edward K. Bowen et al.

It is certified that error appears in the above identified patent and that said Letters Patent are hereby corrected as shown below:

Column 2, line 35, "quick-fool-" should read -- quick, fool- --. Column 4, line 56, "gap of" should read -- gap or --. Column 5, line 12, cancel "an", second occurrence. Column 6, after line 71, insert

| | | | |
|---|---|---|---|
| 3,021,161 | 2/1972 | Rhoads et al | 277-37 |
| 3,163,476 | 12/1964 | McKinven | 308-187.1 |
| 3,207,521 | 9/1965 | Dega | 277-58X |
| 3,281,190 | 10/1966 | Cox | 277-58X |

FOREIGN PATENTS

| | | |
|---|---|---|
| 1,162,138 | 1/1964 | Germany |
| 590,874 | 7/1947 | Great Britain |

(SEAL)      Signed and sealed this 12th day of January 1971.

Attest:

Edward M. Fletcher, Jr.          WILLIAM E. SCHUYLER, JR.

Attesting Officer                  Commissioner of Patents